United States Patent [19]

Kaminski

[11] 4,289,231

[45] Sep. 15, 1981

[54] ARTICLE FEEDING APPARATUS

[75] Inventor: Elton G. Kaminski, Sidney, Ohio

[73] Assignee: The Stolle Corporation, Sidney, Ohio

[21] Appl. No.: 56,835

[22] Filed: Jul. 12, 1979

[51] Int. Cl.³ .............................................. B65G 23/06
[52] U.S. Cl. .................................... 198/834; 198/840;
198/842; 474/900
[58] Field of Search ................................ 198/655–656,
198/834, 835, 842, 843, 840; 74/230.4, 230.5,
243 R, 243 C, 243 DR, 243 DC; 193/37

[56]  References Cited
U.S. PATENT DOCUMENTS

| | | | |
|---|---|---|---|
| 889,342 | 6/1908 | Snyder | 198/840 X |
| 1,472,252 | 10/1923 | Smith | 198/842 X |
| 1,691,408 | 11/1928 | Palmer | 74/243 PC |
| 3,231,065 | 1/1966 | Kaminski | 198/656 |

Primary Examiner—Robert B. Reeves
Assistant Examiner—Douglas D. Watts
Attorney, Agent, or Firm—Frost & Jacobs

[57] ABSTRACT

An apparatus for intermittently feeding a series of like articles along a path so as to present them in succession to a plurality of operation stations where operations are performed upon the articles in sequence. The apparatus is provided with at least a pair of spaced drums mounted on parallel axes and a one-piece substantially non-stretchable belt passing around the drums. One of the spaced drums constitutes a driving drum and the other of the spaced drums constitutes a low inertia idler drum.

9 Claims, 17 Drawing Figures

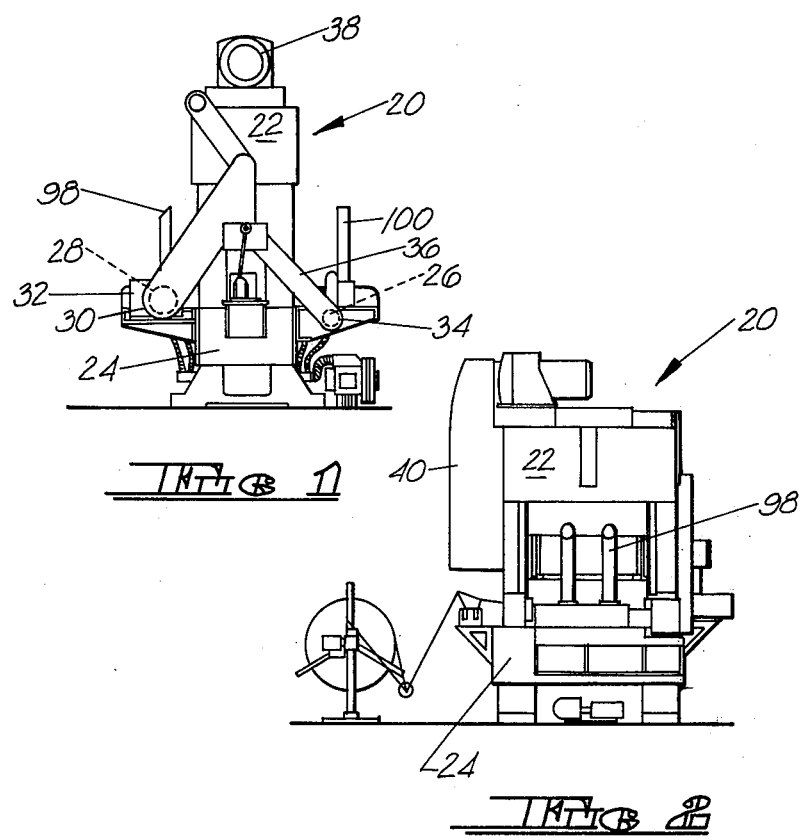
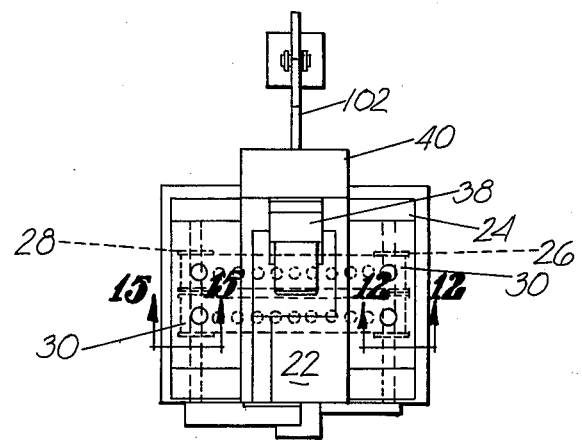

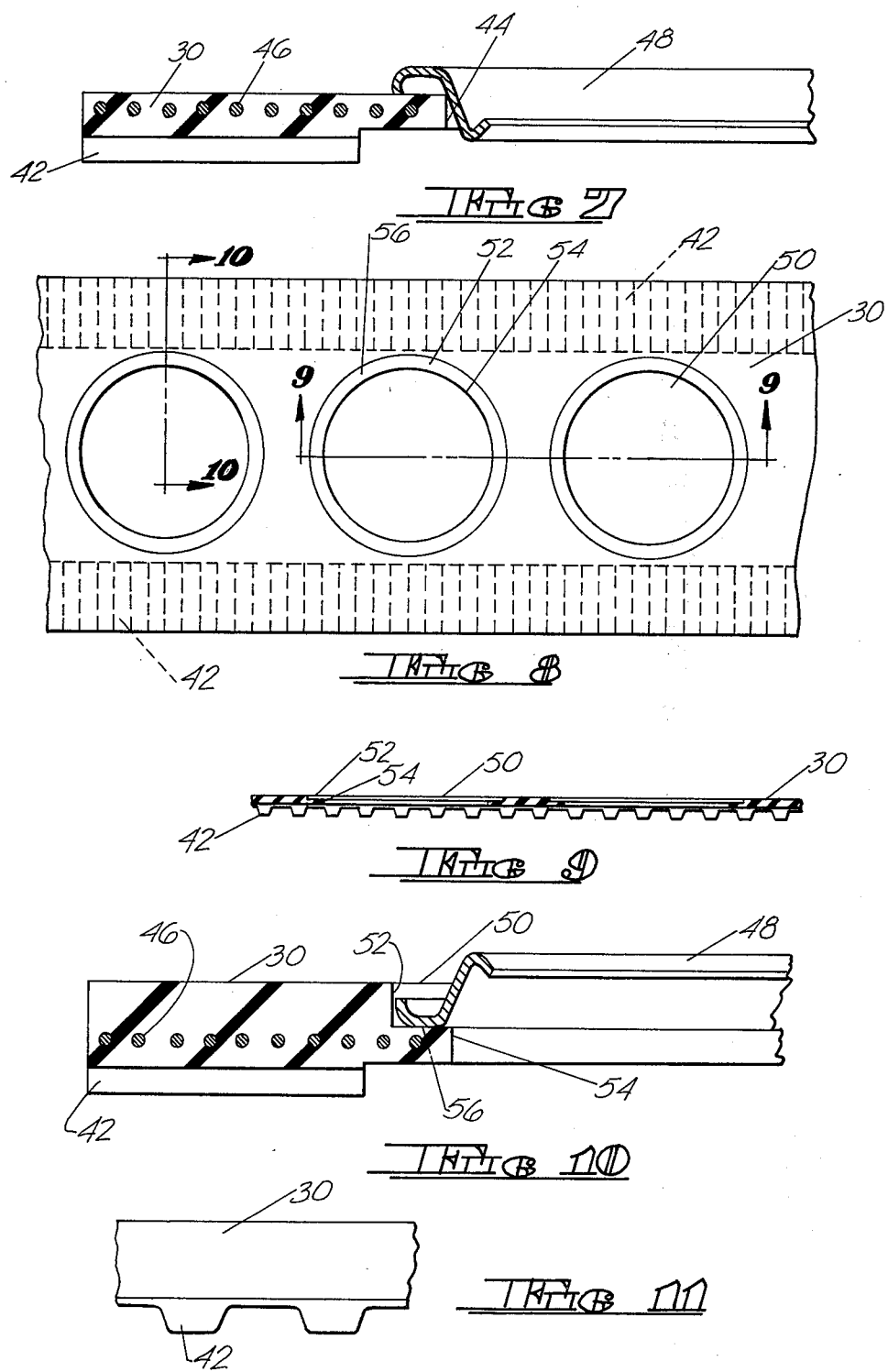

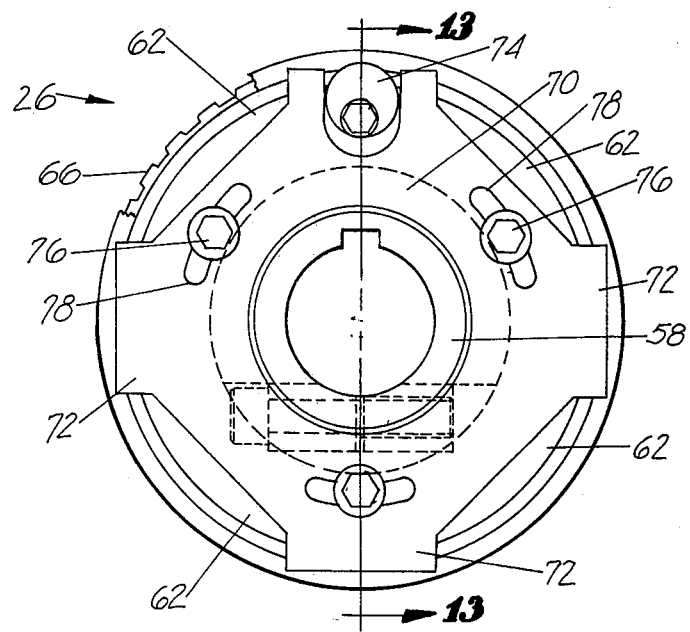
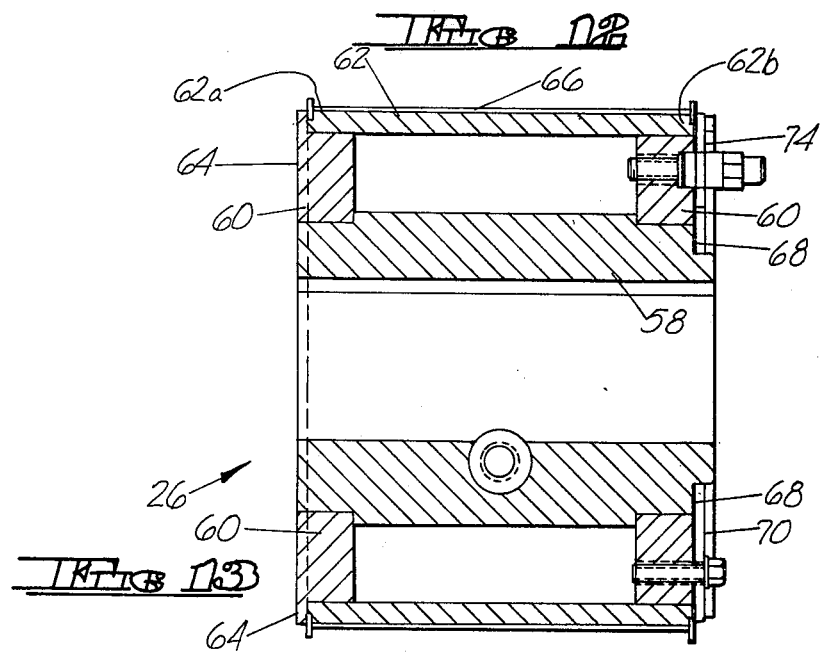
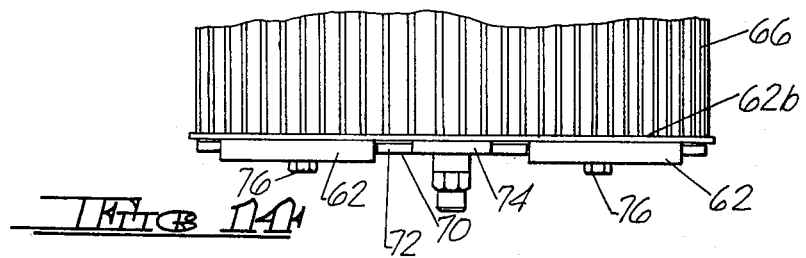

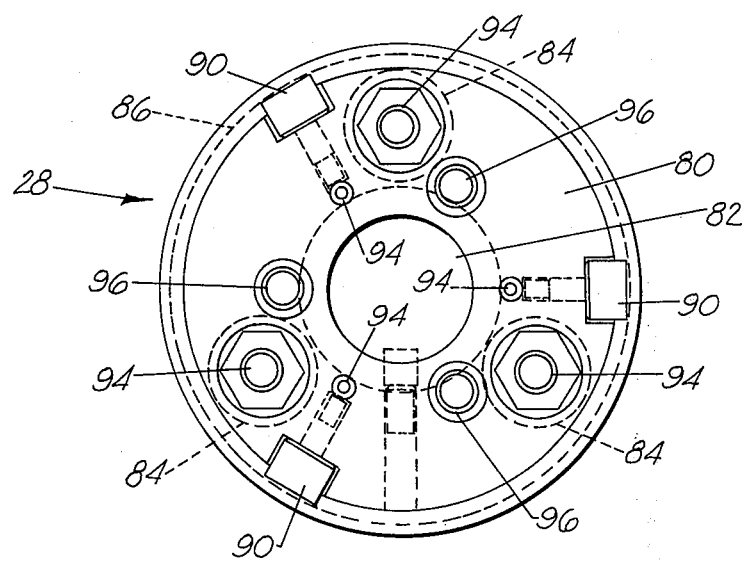
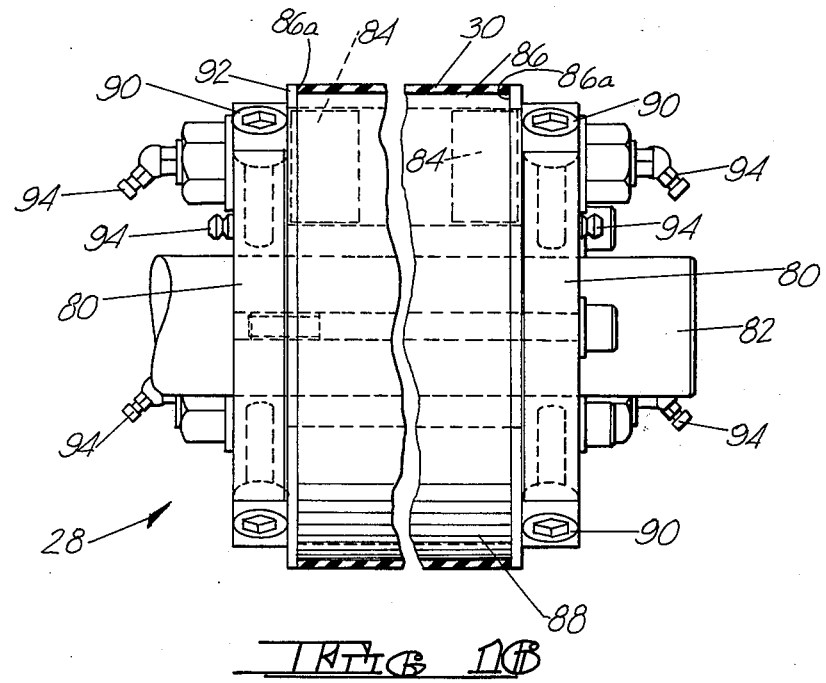

ARTICLE FEEDING APPARATUS

TECHNICAL FIELD

The present invention relates to an article feeding apparatus and more specifically to an apparatus suitable for feeding a succession of articles upon which a series of operations is to be performed, in a step by step manner, along a path so as to deliver each article in succession to a plurality of operating stations at which certain operations are to be performed upon it.

BACKGROUND OF THE ART

U.S. Pat. No. 3,231,065, in the name of Kaminski, et al, discloses an article feeding apparatus which is a substantial improvement over most intermittent feed conveyers, which are of the rotary type wherein the articles to be operated upon are fed in succession onto a conveyor wheel which then indexes intermittently through a series of positions at which a number of operations may be carried out upon the article. In order to provide for high speed production in a feed conveyor of the rotary type it is necessary that the feed be extremely accurate such that each articles is presented in its indexed position in exactly correct orientation for the operation which is to be performed upon it. This is difficult to accomplish because of the problem of inertia in intermittent feed apparatus. The turret type of apparatus requires a relatively heavy element to be started up from a stand still, moved through a certain part and brought to a stop. This requires complicated apparatus and excessive amount of power. The article feeding apparatus of U.S. Pat. No. 3,231,065 was a substantial improvement over the prior art because it provided a feed mechanism whereby there is a minimum of inertia in the moving parts such that starting and stopping intermittently did not present a serious problem. It furthermore provided an apparatus wherein the intermittent feed could be extremely accurate without the need for complex mechanism which had been theretofore necessary for accurate positioning of the workpieces.

While the article feeding apparatus of U.S. Pat. No. 3,231,065 has generally proven to be satisfactory, the art is always seeking to improve upon what has gone on before in order to develop new article feeding apparatus which are capable of higher speed and low cost article production. More particularly, the art has continually sought to develop improvements in the non-stretchable belt passing around the drums, as well as in the means to accurately adjust the driving sprocket on the driving drum to align the articles on the belt with the tool stations. Additionally, the art has continually sought improvements in the idler take-up drum for use with the article transfer belt so as to eliminate abrasion on the back side of the belt due to slippage and reduce the weight, i.e., inertia, of the idler each time the belt intermits to transfer the articles, which is particularly important at high speeds.

FIGS. 4A and 4B are exemplary of problems attributable to prior art belts. The belt 10 of FIGS. 4A and 4B is made endless by riveting (FIG. 4B) or welding (FIG. 4A), if metallic, or adhesively secured if non-metallic. Holes 12 are provided along at least one edge of the belt 10 for accurate indexing without slip. However, a number of problems have been evidenced with this belt construction. For example, in the metallic belt 10, the metallic material must be selected with high fatigue resistance. This material is required to withstand the flexural stress imposed as the belt 10 wraps around the drums. When this material is welded (FIG. 4A), the metal in the weld area becomes annealed, as at 13. The boundary layer between the annealed weld metal and the non-annealed parent metal becomes embrittled and failure occurs in this area and the belt splice breaks.

The prior art has developed a riveted joint 15 for metallic belts 10, as shown in FIG. 4B, which eliminates the embrittled metal problem. However, the belts 10 now fail in service due to fatigue failure in the basic metal propagating cracks 14 from the edges of the belt 10 into the holes 12 along the edges of the belt 10 and finally into the article carrying apertures 16 in the center of the belt 10. This failure occurs because the fatigue limit, in turns of number of bending cycles (around the drums), has been reached. Additional wear areas on the belt 10 are shown at 17.

The useful service life of the belt 10 can be improved by increasing the diameter of the driving and idler drums in order to reduce the bending stress on the belt. This, however, increases the mass of the components which must be intermittently started and stopped, causing undue load on the driving mechanism due to increased inertia. Further, as the driving drum diameter is increased, positioning accuracy is decreased.

Non-metallic, non-stretchable belts overcome the fatigue failure problems of metallic belts 10. However, edges holes 12 in a non-metallic belt 10 cooperating with sprocket teeth in the driving drum, do not provide the required positioning accuracy. This is so because the edge holes 12 are resilient and yield against the pressure of the sprocket teeth on the driving drum. Attempts to provide metallic bushings in the edge holes have not provided successful and have greatly increased the cost of the belt 10.

The prior art has endeavored to utilize the teachings of U.S. Pat. No. 3,812,953, in the name of Marvin W. Maschke in an attempt to solve the aforementioned problems attributable to non-metallic, non-stretchable belts. However, this has not proven successful since it has been found that the edge of the article apertures in the belt will yield instead of properly seat over the locating plugs. Further, the Maschke driving or idler drums are expensive construction particularly with articles that are other than round.

DISCLOSURE OF THE INVENTION

The present invention provides an improvement in an apparatus for intermittently feeding a series of like articles along a path so as to present them in succession to a plurality of operation stations where operations are performed upon the articles in sequence. The apparatus is of the type having a pair of spaced drums mounted on parallel axes and a one-piece substantially non-stretchable belt passing around the drums. Means are provided for intermittently driving one of the drums whereby to move the belt intermittently a predetermined distance.

According to the present invention the belt is of flexible material having non-stretchable elements embedded therein and running longitudinally of the belt whereby to give the belt non-stretch characteristics. The belt is provided with inwardly projecting driving teeth along both edges thereof and with seating elements of a shape to fit the articles regularly and accurately spaced along its length.

According to the invention one of the spaced drums constitutes a driving drum to move the belt intermittently a predetermined distance. The driving drum is provided with a hub having a peripheral flange at one end thereof. A cylindrical rim, providing axially aligned sprocket teeth about it periphery, is mounted about the hub with a first end thereof in abutment with the peripheral flange of the hub. The other end of the rib has at least one notch formed therein, and a spider is mounted on the hub having at least one arm engageable in the at least one notch of the rim to lock the rim with respect to the hub. Means are provided to rotatably adjust the spider with respect to the hub so as to rotatably adjust the rim, and thus the sprocket teeth, with respect to the hub.

Finally, according to the present invention the other of the spaced drums constitutes a low inertia idler drum. The idler drum comprises a pair of spaced side plates fixed between a non-rotatable shaft. Opposed coaxial pairs of first roller bearing means are mounted in the side plates, the axes of the first roller bearing means being substantially parallel to the axis of the non-rotatable shaft. A sleeve is rotatably mounted around the first roller bearing means and opposed pairs of second roller bearing means bear against the peripheral edges of the sleeve to provide axial guiding for the sleeve. The opposed pairs of second roller bearing means have axes substantially perpendicular to the axes of the shaft.

DESCRIPTION OF THE DRAWINGS

FIG. 1 is a somewhat diagrammatic elevational view of an apparatus according to the invention.

FIG. 2 is an end view of the same.

FIG. 3 is a plan view of the same.

FIG. 7 is a fragmentary view taken on the line 7—7 of FIG. 5.

FIG. 8 is a plan view of a further belt according to the present invention.

FIG. 9 is a cross sectional view taken on the line 9—9 of FIG. 8.

FIG. 10 is a cross sectional view taken on the line 10—10 of FIG. 8.

FIG. 11 is an enlarged, fragmentary view showing the inwardly projecting driving teeth along both edges of the underside of the belts of FIGS. 5 and 8.

FIG. 12 is an end, partial cut away, view of a driving drum according to the present invention taken on the line 12—12 of FIG. 3.

FIG. 13 is a cross sectional view through the driving drum of FIG. 12 taken along the line 13—13 of FIG. 12.

FIG. 14 is a partial plan view of the driving drum of FIG. 12.

FIG. 15 is an end view of a low inertia idler drum according to the present invention taken on the line 15—15 of FIG. 3.

FIG. 16 is a side elevational view of the idler drum of FIG. 15 with the belt shown in section.

DETAILED DESCRIPTION OF THE INVENTION

Figure 4A:
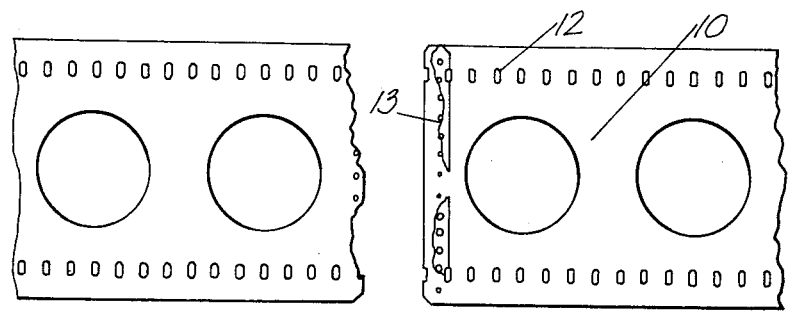
FIGS. 4A and 4B are fragmentary plan views of prior art metallic belts showing the problems associated therewith.
Figure 4B:
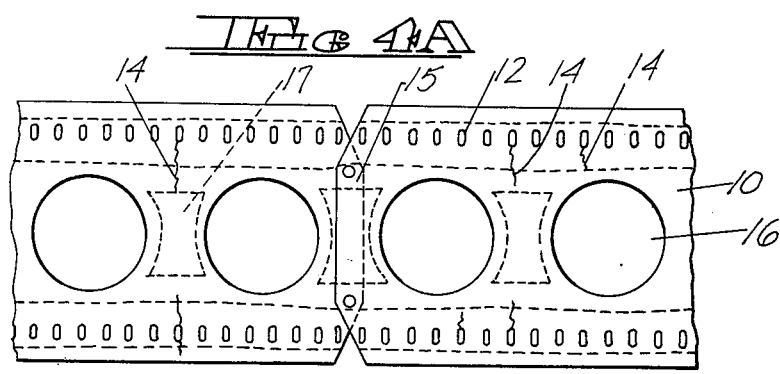

Referring now in more detail to the drawings, the article feeding apparatus 20 of the present invention comprises a frame generally indicated at 22, which serves to carry the apparatus for operating on the articles. In the case of the particular article feeding apparatus 20 disclosed, this includes a plurality of cooperating dies, but since these do not form any part of the present invention they are not shown.

The frame 22 is also provided with a bed 24 which serves as a support for the conveying apparatus which does form the object of the present invention. Basically, this conveying apparatus is constituted by one or more driving drums 26, associated idler or take up drums 28, and at least one belt 30 of substantially non-stretchable material passing around the drums 26 and 28. The driving drums 26 are fixed as to their positions while the idler drums 28 are rotatably mounted on a carriage 32 which may be adjusted to adjust the distance between the drums 26 and 28.

A suitable drive mechanism is provided for the shaft 34 on which the driving drums 26 are mounted. This drive may be any of the well known intermittent drives such as for example a "Ferguson" drive, and it is indicated diagrammatically in the drawings at 36. Power may be supplied to the drive from a motor 38 through a shaft 40. Since the intermittent drive mechanism forms no part of the present invention it has not been described in detail.

Figure 5:
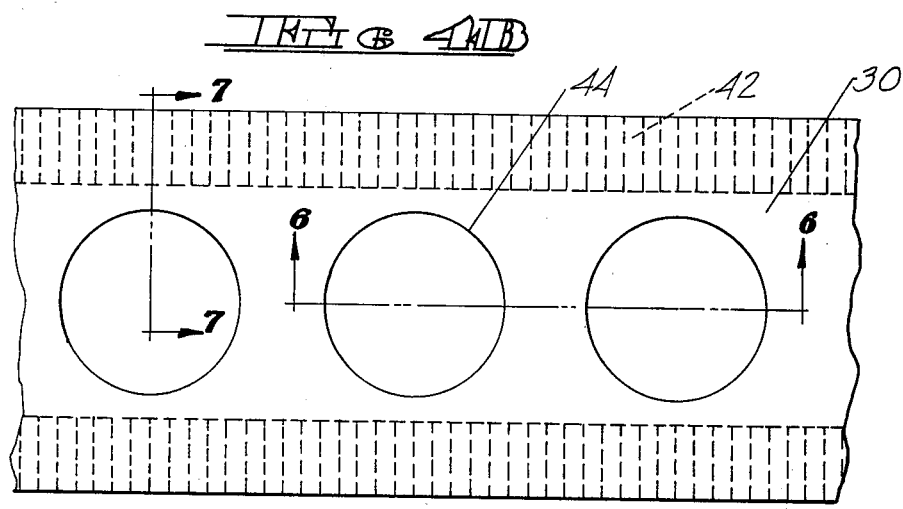
FIG. 5 is a fragmentary plan view of a belt according to the present invention.
Figure 6:
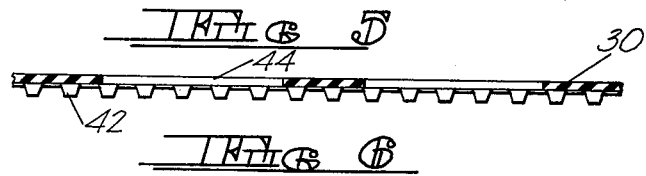
FIG. 6 is a cross sectional view taken on the line 6—6 of FIG. 5.

A belt 30 is shown in greater detail in FIGS. 5 through 7. It is generally made of a laminated fabric material impregnated with chloroprene or the like and is provided with inwardly projecting driving teeth 42 along both edges thereof, which are arranged to cooperate with a drive drum 26 and provide accurate indexing without slip. It will, of course, be understood that the teeth 42 will be cut out or interrupted in the area of the apertures 44 which serve as article seating elements of the belt 30. For accurate positioning of work pieces at the work stations, it is essential that the belt 30 have non-stretch characteristics and therefore steel wires or cables 46 are embedded in the material of the belt 30 so as to give it non-stretch characteristics.

The articles to be fed in the particular embodiment illustrated are can ends which are to be scored and have a pull tab riveted thereto to provide easy open can ends. The particular apertures 44 illustrated serve to seat the can ends, one of which is illustrated at 48 in FIGS. 7 and 10.

In the particular embodiment shown, when the articles being processed are beer can lids, the locating elements for the articles being processed are in the form of equally spaced holes 44 in belt 30 in which the beer can lids are seated. It will be understood that the locating elements may be of any desired or necessary type and this may include circular or other shaped holes, slots are suitable jigs or fixtures secured to the belt.

It should be pointed out that the belt 30 will be molded as an endless belt with the interrupted teeth 42 on the underneath surface molded at the same time. The article receiving holes 44 spaced down the center line of the belt are punched and are sized to fit the diameter of the article 48 to be conveyed.

The belt 30 of FIGS. 8 through 10 is identical to the belt 30 of FIGS. 5 through 7 with the exception of the configuration of the apertures 50, each of which comprises a stepped hole having a larger diameter in its upper portion 52 than in its lower portion 54 so as to form an annular shoulder 56 between the upper and lower portions 52 and 54. The stepped hole 50 is required to transport a can end 48 upside down, as best seen in FIG. 10, which, at times, is a requirement. This is a substantial improvement over belts of the prior art wherein such belts cannot be used for upside down conveying of can ends or similar articles without use of special attachments or other appliances.

A driving drum 26 is shown in greater detail in FIGS. 13 and 14. In the interest of cutting down weight, the driving drum 42 includes a hub 58, a pair of side plates 60 and a cylindrical rim 62, which provides axially aligned sprocket teeth 66 about its periphery. This provides a hollow annular chamber and considerably lightens the drum 26. In the preferred embodiment, the hub 26 is provided with a peripheral flange 64 at one end thereof. The rim 62 is mounted about the hub 26 with a first end 62a thereof in abutment with the peripheral flange 64 of the hub 58. The other end 62b of the rim is provided with at least one notch 68 formed therein. A spider 70 having at least one lug or arm 72 engagable in the notch 68 of the rim 62 to lock the rim 62 with respect to the hub 58, is mounted on the hub 58. Means are provided to rotatably adjust the spider 70 with respect to the hub 58 so as to rotatably adjust the rim 62, and thus the sprocket teeth 66, with respect to the hub 58. The means to rotatably adjust the spider 70 of the driving drum 26 may comprise a circular member 74 which sets in the notch 68 and is eccentrically mounted so that rotation thereof will cause rotation of the spider 70 and the rim 62.

In operation the sprocket teeth 66 of the driving drum 26 can be accurately adjusted to align the articles, such as the can ends 48 in the apertures 44, 50 on a belt 30, with the tool stations by initially loosening the bolts 76 extending through the arcuate slots 78 in the spider 70 securing the spider 70 to the side plates 60. This allows the spider 70 to be free to rotate in either direction about the hub 58. The eccentrically mounted circular member 74 may then be turned to the right or left, as desired, which in turn rotates the spider 70 to the right or left. Since the spider arms or lugs 72 are engaged in the notches 68 in the edge of the rim 62, the rim 62, and thus the sprocket teeth 66, are caused to rotate to the right or left, as desired. When the sprocket teeth 66 are in the desired position, the bolts 76 are tightened.

It will be understood that the sprocket teeth 42 on the underside of the belt 30 and the sprocket teeth 66 on the driving drum 26 are not required to drive the belt from the drum 26, but simply to maintain accurate orientation of the jigs or fixtures or other abutments provided in a belt 30 to hold the articles being processed.

It will further be understood that if the accuracy of space between the fixtures or holes 44, 50 is made very accurately and if the sprocket teeth 42 on the underside of the belt are made accurately and the sprocket teeth 66 on the driving drum 26 are accurately oriented and aligned, the articles carried by the belt 30 will be moved successively in exact increments, so that a series of operations may be carried out upon them. It will be clear that multiple rows of articles may be conveyed by means of one or more parallel belts 30 in any desired arrangement.

FIGS. 15 and 16 disclose a low inertia take up or idler drum 28 for use with a belt 30 of the article feeding apparatus 20 of the present invention. The low inertia take up or idler drum 28 is necessary to eliminate abrasion on the back side of a belt 30 due to slippage and to reduce the weight (inertia) of the idler each time a belt 30 intermits to transfer the articles. This is particularly important at high speeds.

More particularly, the low inertia idler or take up drum 28 comprises a pair of spaced side plates 80 fixed to a non-rotatable shaft 82. The side plates 80 are keyed to the shaft 82 and held together by screw assemblies 96. Opposed coaxial pairs of first roller bearing means are mounted on the side plates 80. In practice the opposed coaxial pairs of first roller bearing means comprise three coaxial opposed pairs of roller bearings 84 mounted 120° degrees apart around the side plates 80. The axes of the opposed coaxial pairs of first roller bearings 84 are substantially parallel to the axis of the non-rotatable shaft 82. A sleeve 86 is rotatably mounted around the opposed coaxial pairs of first roller bearings 84. The upper surface of the sleeve 86 may be provided with axially aligned sprocket teeth 88 about its periphery to mate with the teeth 42 on the underside of a belt 30 so that no slippage can occur between the belt 30 and the idler drum 28. Opposed pairs of second roller bearing means, which may comprise three opposed pairs of roller bearings 90 mounted 120° apart around the side plates 80, bear against the peripheral edges 86a of the sleeve 86 to provide axial guiding for the sleeve 86. The axes of three coaxial opposed pairs of roller bearings 90 are substantially perpendicular to the axis of the shaft 82.

In practice it has been found preferable to have the three coaxial opposed pairs of roller bearings 90 bear against peripheral flanges 92 provided on both edges 86a of the sleeve 86.

Suitable lubrication fittings 94 are provided for the roller bearings 84, 90 so that the moving parts of the low inertia idler or take up drum 28 may be readily lubricated.

As previously indicated, shaft 82 is fixed and does not rotate. The side plates 80, which hold the bearings 84, 90, being keyed to the shaft 82, also does not rotate. Accordingly, only the sleeve 86 turns.

In FIGS. 1 through 3, there are diagrammatically indicated feeding hoppers 98 which may contain a stack of beer can lids 48 or the like which are fed off the bottom onto the holes 44, 50 in the belt or belts 30. Adjacent the drive drum 26 there is indicated a stacker 100 for the completed articles. The completed articles may, of course, be permitted to fall from the belt or belts 30 by gravity as they pass over the drum 26 and may be collected in a suitable chute or hopper or they may be pushed up from beneath into a stacking device as diagrammatically indicated at 100. These devices do not constitute a part of the present invention and are therefore not disclosed in detail.

It will be understood that the article feeding apparatus herein described may be used in performing a series of operations upon a workpiece and also in assembly operations. Thus, for example, there is diagrammatically illustrated at 102 a lateral conveyer which may be operated in timed relation to the belt 30 and which may feed elements into position for assembly to the elements being carried by a belt 30 at any one of the operating stations. Since the details of such conveyers do not form a part of the invention, they are not illustrated other than diagrammatically.

The description herein has been by way of example and no limitations are intended which are not specifically set forth.

What is claimed is:

1. In apparatus for intermittently feeding a series of like articles along a path so as to present them in succession to a plurality of operation stations where operations are performed upon said articles in sequence, of the type having at least a pair of spaced drums mounted on parallel axes and a one-piece substantially non-stretchable belt passing around said drums, and means for intermittently driving one of said drums whereby to move said belt intermittently a predetermined distance, the improvement, in combination therewith, wherein said belt is of flexible material having non-stretchable elements embedded therein and running longitudinally of said belt whereby to give said belt non-stretch characteristics, said belt having inwardly projecting driving teeth along both edges thereof and having seating elements of a shape to fit said articles regularly and accurately spaced along its length; one of said spaced drums constitutes a driving drum to move said belt intermittently a predetermined distance, said driving drum having a hub, said hub having a peripheral flange at one end thereof, a cylindrical rim providing axially aligned sprocket teeth about its periphery, said rim being mounted about said hub with a first end thereof in abutment with said peripheral flange of said hub, the other end of said rim having at least one notch formed therein, a spider mounted on said hub having at least one arm engagable in said at least one notch of said rim to lock said rim with respect to said hub, and means to rotatably adjust said spider with respect to said hub so as to rotatably adjust said rim, and thus said sprocket teeth, with respect to said hub, and the other of said spaced drums constitutes a low inertia idler drum, said idler drum comprising a pair of spaced side plates fixed to a non-rotatable shaft, opposed coaxial pairs of first roller bearing means mounted on said side plates, the axes of said first roller bearing means being substantially parallel to the axis of said non-rotatable shaft, a sleeve rotatably mounted around said first roller bearing means, and opposed pairs of second roller bearing means bearing against the peripheral edges of said sleeve, to provide axial guiding for said sleeve, and having axes substantially perpendicular to the axis of said shaft.

2. The apparatus according to claim 1, wherein said means to rotatably adjust said spider of said driving drum comprises a circular member which sits in said at least one notch in said spider and is eccentrically mounted so that rotation thereof will cause rotation of said spider and said rim.

3. The apparatus according to claim 1, wherein the surface of said sleeve is provided with axially aligned sprocket teeth about its periphery so that no slippage can occur between said belt and said idler drum.

4. The apparatus according to claim 1, wherein said opposed coaxial pairs of first bearing means comprise three coaxial opposed pairs of roller bearings mounted 120° apart around said side plates.

5. The apparatus according to claim 1, wherein said opposed pairs of second roller bearing means comprise three opposed pairs of roller bearings mounted 120° apart around said side plates.

6. The apparatus according to claim 1, wherein peripheral flanges are provided on both edges of said sleeve and said opposed pairs of second roller bearing means bear against said peripheral flanges.

7. The apparatus belt according to claim 1, wherein said article seating elements are apertures in which a portion of said articles may be seated.

8. The apparatus according to claim 7, wherein each said apertures comprises a stepped hole having a larger diameter in its upper portion than in its lower portion so as to form an annular shoulder between said upper and lower portions.

9. In an apparatus having a belt passing over at least two cylindrical drums, and having means for intermittently driving one, at least, of said drums for feeding a series of articles along a path so as to present them in succession to a plurality of operating stations where operations are performed on said articles in sequence, said belt having a series of equally spaced article receiving apertures to fit said articles; one of said drums constituting a low inertia idler drum comprising a pair of spaced side plates fixed to a non-rotatable shaft, opposed coaxial pairs of first roller bearing means mounted on said side plates, the axes of said first roller bearing means being substantially parallel to the axis of said non-rotatable shaft, said opposed coaxial pairs of first bearing means comprising three coaxial opposed pairs of roller bearings mounted 120° apart around said plates, a sleeve rotatably mounted around said first roller bearing means, said sleeve being provided with a peripheral flange at both edges thereof and with axially aligned sprocket teeth about its periphery so that no slippage can occur between said belt and said idler drum, and opposed pairs of second roller bearing means bearing against said peripheral flanges of said sleeve, to provide axial guiding of said sleeve, and having axes substantially perpendicular to the axis of said shaft, said opposed pairs of second idler bearing means comprising three opposed pairs of roller bearings mounted 120° apart around said side plates.

* * * * *